United States Patent [19]
Coulter

[11] Patent Number: 5,533,294
[45] Date of Patent: Jul. 9, 1996

[54] FISHING ROD HOLDER

[76] Inventor: Thomas W. Coulter, 601 S. Vista La., Box 149, Edmond, Okla. 73034

[21] Appl. No.: 433,720

[22] Filed: May 3, 1995

[51] Int. Cl.$^6$ ............................................. A01K 97/12
[52] U.S. Cl. .................................................... 43/15
[58] Field of Search .......................................... 43/15, 16

[56]          References Cited

U.S. PATENT DOCUMENTS

| | | | |
|---|---|---|---|
| 693,071 | 2/1902 | Ruud . | |
| 2,008,555 | 7/1935 | Kovane | 43/16 |
| 2,564,840 | 8/1951 | Glenn | 43/16 |
| 2,661,563 | 12/1953 | Adams, Jr. et al. | 43/16 |
| 2,740,219 | 4/1956 | Harden | 43/16 |
| 2,744,351 | 5/1956 | Smith | 43/16 |
| 2,804,277 | 8/1957 | Kinder | 43/15 |
| 2,821,041 | 1/1958 | Hughes | 43/16 |
| 2,835,065 | 5/1958 | Schwartzkopf | 43/15 |
| 2,944,361 | 7/1960 | Coulter | 43/16 |
| 3,407,527 | 10/1968 | Hill | 43/15 |
| 3,837,109 | 9/1974 | DeJulio | 43/15 |
| 4,231,178 | 11/1980 | Black | 43/16 |
| 4,235,035 | 11/1980 | Guthrie | 43/15 |
| 5,245,778 | 9/1993 | Gallegos et al. | 43/15 |

*Primary Examiner*—Kurt Rowan
*Assistant Examiner*—Darren W. Ark
*Attorney, Agent, or Firm*—Dunlap & Codding

[57]          ABSTRACT

A fishing rod holder utilizing a single supporting flat bar and a tubular member pivotally secured to the upper end of the flat bar by means of a square cross-section shaft extending through a combination circular aperture and rectangular slot in the single bar. The holder is "cocked" by moving the square cross-section shaft into the rectangular slot and is operated to swing the fishing rod upwardly when a fish takes the bait attached to the fishing line extending from the fishing rod.

4 Claims, 1 Drawing Sheet

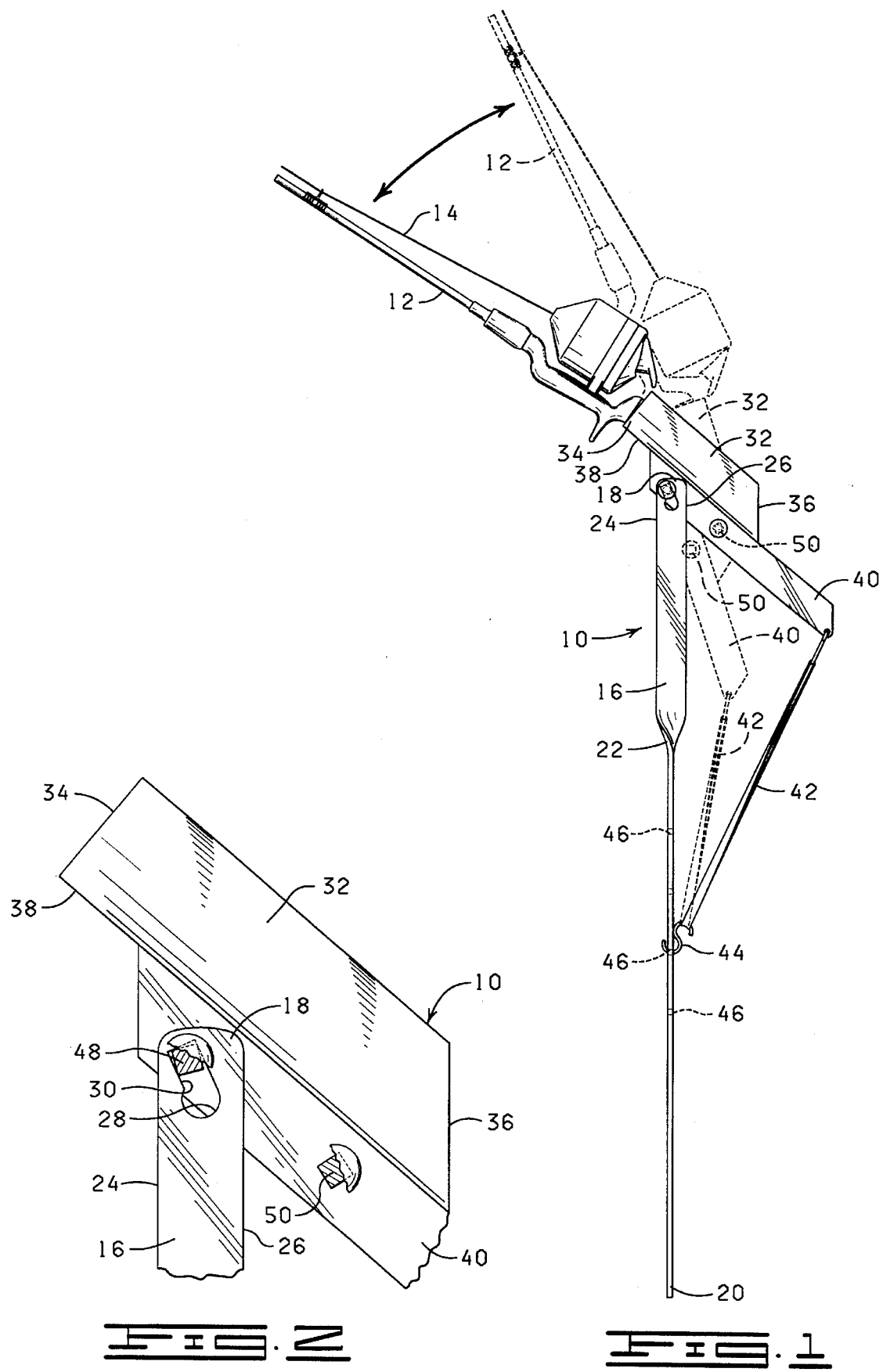

FISHING ROD HOLDER

BRIEF SUMMARY OF THE INVENTION

1. Field of the Invention

An improvement in fishing rod holders of the type designed to catch fish when unattended.

2. Background of the Invention

A number of devices have been developed for holding a fishing rod and automatically pivoting the fishing rod when the outer end thereof is pulled by a fish biting bait on the end of a line extending from the fishing rod. Heretofore, however, such fishing rod holders have either been overly complicated and expensive to manufacture, or have been operably ineffective.

The present fishing rod holder comprises a simple construction which can be economically manufactured and which will be effective in operation.

BRIEF DESCRIPTION OF THE DRAWINGS

FIG. 1 is a side elevational view of the fishing rod holder, showing the two operating positions of the holder, one of which is in phantom.

FIG. 2 is an enlarged, partial cross-sectional view of a portion of the fishing rod holder to facilitate the disclosure of the structure.

Referring to the drawings in detail, and particularly FIG. 1, reference character 10 generally designates a fishing rod holder adapted to hold a fishing rod 12 in a "cocked" position as shown in solid lines in FIG. 1 and to quickly move the fishing rod 12 to a "catching" position as shown in dashed lines in FIG. 1 when a fish takes the bait which is normally attached to the hook on the end of the fishing line 14 and bends the outer end of the fishing rod 12 downwardly causing a "jerking" type action known as setting the hook.

The holder 12 includes a single, flat bar 16 having an upper end 18 and a lower end 20. The lower end 20 is normally suitably shaped for insertion in the ground adjacent a body of water. The bar 16 is twisted approximately 90° at an intermediate location 22 along its length and provides what may be considered a front edge 24 and a rear edge 26. As shown most clearly in FIG. 2, a generally circular shaped aperture 28 is formed near the upper end 18 of the bar 16 and a rectangular shaped slot 30 extends from the aperture 28 upwardly and forwardly with respect to the bar 16.

The fishing rod holder 10 further includes a tubular member 32 having a forward end 34 and a rearward end 36. As shown in FIG. 1, the tubular member 32 is of a size to receive the handle portion of the fishing rod 12. The tubular member 32 also has a lower surface 38 along which is secured another flat bar 40. The bar 40 extends rearwardly from the rear end 36 of the tubular member 32 and is apertured to receive one end portion of a tension spring 42 such as a rubber band. The opposite end of the tension band 42 is secured by an S hook 44 through one of several apertures 46 in the flat bar 16 below the 90° bend portion 22. As is shown in FIG. 1, there are several of the apertures 46 spaced along the length of the bar 16 to adjust the effective tension of the rubber band or bands 42.

A square cross-sectional shaft 48 is secured to the bar 40 and extends from the bar 40 either through the aperture 28 or through the slot 30 of the bar 16, depending upon the mode of operation, as will be described. It should be noted however, that the shaft 48 is of a size to turn in the aperture portion 28, but is also sized to engage the walls of the slot 30 when in the slot 30 to prevent the bar 40 from pivoting when the shaft 48 is in the slot 30.

A stop pin 50 extends from the side of the bar 40 adjacent the flat bar 16 and is positioned to engage the rearward edge 26 of the bar 16 when the tubular member 32 and the bar 40 are in the position shown in dashed lines in FIG. 1.

Operation

In preparation for fishing, the lower end 20 of the bar 16 is pushed into the ground, such that the holder 10 will be firmly supported. The fishing rod 12 is then placed in the holder with the handle in the tubular member 32 as shown in solid lines in FIG. 1. The holder 10 is then "cocked" by the fisherman raising upwardly on the rearward end portion 36 of the tubular member 32 and associated bar 40 until the shaft 48 slides into the slot 30. The holder 10 and fishing rod 12 will then be in the solid line positions shown in FIG. 1. It is assumed that the fisherman has cast a baited hook into the body of water using the fishing line 14.

When a fish takes the bait attached to the end of the fishing line 14, the rod 12 will be bent down and a force will thereby be applied through the handle portion of the rod 12 to the tubular member 32, such that the square shaft 48 will slide downwardly out of the slot 30 into the circular aperture portion 28. When this happens, the tension band 42 snaps the tubular member 32 and bar 40 to the position shown in dashed lines in FIG. 1 for jerking the fishing rod 12 to catch the fish on the end of the line 14. The tubular member 32 and bar 40 are stopped by the stop pin 50 engaging the rearward edge 26 of the flat bar 16 in the manner shown in dashed lines in FIG. 1.

Changes may be made in the combination and arrangement of parts or elements as heretofore set forth in the specification and shown in the drawings without departing from the spirit and scope of the invention as defined in the following claims.

What is claimed is:

1. A holder for supporting a fishing rod having a handle, and swinging the fishing rod when the outer end of the rod is pulled by a fish, comprising:

a single flat bar having a forward edge, a rearward edge, an upper end and a lower end, the lower end being shaped to be pushed into the ground adjacent a body of water;

the upper end portion of said bar having a generally circular aperture therethrough and a rectangular slot therethrough extending upwardly and forwardly from said aperture;

a tubular member sized to receive the handle of the fishing rod therethrough; said tubular member having a forward end, a rearward end and a lower surface;

a second bar having a forward end and rearward end secured to the lower surface of the tubular member and protruding beyond the rearward end of the tubular member;

a square cross-sectional shaft extending from one side of the second mentioned bar sized to rotate in said circular aperture in one position and fit without rotation in said rectangular slot in a second position; and a tension spring secured between the rearward end of said second bar and an intermediate portion of the single, flat bar; thereby when said shaft extends through said rectangular slot, said spring will be under tension and a fishing rod extending into said tubular member will be in a first position, and when said shaft is moved into said circular aperture, the spring will retract, rotating the tubular member and the fishing rod about said shaft.

2. A holder as defined in claim 1 wherein said single bar is twisted approximately 90° at an intermediate portion thereof.

3. A holder as defined in claim 2 wherein said singular bar has a plurality of vertically spaced apertures therethrough below the 90° twist, and characterized further to include a hook at one end of said spring for selectively engaging the apertures in said single bar below the 90° twist to adjust the tension of the spring.

4. A holder as defined in claim 1 characterized further to include a stop pin protruding from a side of said second bar positioned to engage the rear edge of said single flat bar when the square shaft is in said substantial circular aperture and the tubular member is rotated with the outer end of the fishing rod extending generally upward.

* * * * *

UNITED STATES PATENT AND TRADEMARK OFFICE
CERTIFICATE OF CORRECTION

PATENT NO. : 5,533,294
DATED : July 9, 1996
INVENTOR(S) : Thomas W. Coulter

It is certified that error appears in the above-identified patent and that said Letters Patent is hereby corrected as shown below:

Column 2, line 53, between "bar" and "secured", delete "having a forward end and a rearward end".

Column 2, line 64, after "bar;", delete "thereby" and insert --whereby-- therefor.

Signed and Sealed this

Twelfth Day of November, 1996

Attest:

BRUCE LEHMAN

Attesting Officer     Commissioner of Patents and Trademarks